United States Patent
Seiss et al.

(10) Patent No.: US 11,026,523 B2
(45) Date of Patent: *Jun. 8, 2021

(54) TEMPERATURE MONITORING AND CONTROL SYSTEM

(71) Applicant: UNIFIED BRANDS, INC., Jackson, MS (US)

(72) Inventors: Rick Seiss, Madison, MS (US); Arthur DeLorenzo, Mt. Pleasant, MI (US); Sakthivel Sandhalingam, Bangalore (IN); Ryan McMartin, Weidman, MI (US)

(73) Assignee: Unified Brands, Inc., Jackson, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/111,610

(22) Filed: Aug. 24, 2018

(65) Prior Publication Data
US 2019/0167014 A1 Jun. 6, 2019

Related U.S. Application Data

(60) Provisional application No. 62/549,769, filed on Aug. 24, 2017, provisional application No. 62/629,782, (Continued)

(51) Int. Cl.
*A47F 3/04* (2006.01)
*A47J 36/24* (2006.01)
(Continued)

(52) U.S. Cl.
CPC ............ *A47F 3/0478* (2013.01); *A47F 3/145* (2013.01); *A47F 10/06* (2013.01); *A47J 36/24* (2013.01);
(Continued)

(58) Field of Classification Search
CPC ...... A47F 10/06; A47F 3/0404; A47F 3/0478; A47F 3/0486; G06Q 10/08; G06Q 10/087;
(Continued)

(56) References Cited

U.S. PATENT DOCUMENTS 3,881,462 A * 5/1975 Barnett ................. F24C 15/022
126/197
4,568,201 A 2/1986 Noda
(Continued)

FOREIGN PATENT DOCUMENTS

AU 2014202504 A1 11/2014
EP 2941986 11/2015
(Continued)

OTHER PUBLICATIONS

Leonardo Bonnanni, Attention-Based Design of Augmented Reality Interlaces, Late Breaking Results: Posters, Apr. 2-7, 2005, CHI 2005, Portland, Oregon, USA.

*Primary Examiner* — Henry T Crenshaw
(74) *Attorney, Agent, or Firm* — Kutak Rock LLP

(57) ABSTRACT

A temperature monitoring and control system is provided. The system includes a plurality of temperature sensors for obtaining temperature readings of food items. The system is scalable and configurable with each sensor being capable of functioning as an individual sensor and/or as part of a grouping of sensors. The system is configured to obtain a variety of information, such as ambient air temperature, dwell time of food items, moisture levels, and the like, thereby enabling the system to recognize current and future temperature concerns. The system provides audio and visual warnings and visual displays. In some embodiments, the system performs one or more physical operation based on one or more detected condition. The system is further configured to distinguish between accurate temperature (Continued)

readings and inaccurate temperature readings and/or to otherwise determine if an obstacle is preventing a temperature sensor from obtaining an accurate temperature reading.

25 Claims, 9 Drawing Sheets

Related U.S. Application Data filed on Feb. 13, 2018, provisional application No. 62/646,630, filed on Mar. 22, 2018.

(51) Int. Cl.
| | |
|---|---|
| *G01K 13/00* | (2021.01) |
| *A47F 3/14* | (2006.01) |
| *G01K 3/00* | (2006.01) |
| *A47J 39/00* | (2006.01) |
| *A47F 10/06* | (2006.01) |
| *A47F 7/00* | (2006.01) |

(52) U.S. Cl.
CPC .............. *A47J 39/00* (2013.01); *G01K 3/005* (2013.01); *G01K 13/00* (2013.01); *A47F 3/043* (2013.01); *A47F 3/0486* (2013.01); *A47F 7/0071* (2013.01)

(58) Field of Classification Search
CPC ...... G06Q 30/0281; G06Q 50/12; G07F 9/02; G07F 9/10; G07G 1/0036; G07G 1/14; G09F 23/00; G09F 23/06; G09F 27/00
USPC .......................................................... 62/130
See application file for complete search history.

(56) References Cited

U.S. PATENT DOCUMENTS

| | | | |
|---|---|---|---|
| 5,243,171 A | 9/1993 | Wood et al. | |
| 5,412,297 A * | 5/1995 | Clark | E05F 15/42 318/266 |
| 5,530,229 A | 6/1996 | Gong et al. | |
| 5,746,114 A | 3/1998 | Harris | |
| 5,893,051 A | 4/1999 | Tomohiro | |
| 5,900,801 A | 5/1999 | Heagle et al. | |
| 5,939,974 A | 8/1999 | Heagle et al. | |
| 6,132,084 A | 10/2000 | Whipple, III et al. | |
| 6,155,160 A | 12/2000 | Hochbrueckner | |
| 6,274,856 B1 | 8/2001 | Clothier et al. | |
| 6,299,920 B1 * | 10/2001 | Saksena | G01K 11/22 219/706 |
| 6,304,178 B1 * | 10/2001 | Hayashida | G01V 8/10 340/545.1 |
| 6,586,714 B2 | 7/2003 | Kawamura et al. | |
| 6,590,192 B2 | 7/2003 | Taino et al. | |
| 6,630,655 B2 | 10/2003 | Fukunaga et al. | |
| 6,675,591 B2 | 1/2004 | Singh et al. | |
| 6,817,757 B1 | 11/2004 | Wallace | |
| 6,856,247 B1 | 2/2005 | Wallace | |
| 7,038,172 B1 | 5/2006 | Stuck | |
| 7,157,675 B2 | 1/2007 | Imura | |
| 7,284,393 B1 * | 10/2007 | Macmillan | B62B 1/22 62/457.7 |
| 7,372,003 B2 | 5/2008 | Kates | |
| 7,446,282 B2 * | 11/2008 | Shei | A47J 39/006 219/391 |
| 8,575,525 B2 | 11/2013 | Mackay | |
| 8,931,400 B1 | 1/2015 | Allen | |
| 9,295,346 B1 | 3/2016 | Bates et al. | |
| 9,477,962 B2 | 10/2016 | Worrall et al. | |
| 9,534,938 B1 | 1/2017 | Zhang et al. | |
| 9,581,338 B2 | 2/2017 | Yamanaka et al. | |
| 2002/0005406 A1 * | 1/2002 | Fukunaga | H05B 6/6455 219/711 |
| 2002/0189462 A1 | 12/2002 | Guess | |
| 2002/0198793 A1 * | 12/2002 | Majd | G06Q 10/06 705/28 |
| 2004/0065103 A1 * | 4/2004 | Monroe | A47J 36/2483 62/258 |
| 2005/0023991 A1 * | 2/2005 | Kemper | G01K 1/06 315/291 |
| 2005/0261991 A1 | 11/2005 | Kennamer | |
| 2008/0120188 A1 * | 5/2008 | Mobley | G06Q 50/12 705/15 |
| 2011/0094160 A1 * | 4/2011 | Houser | E05F 15/63 49/31 |
| 2013/0099715 A1 * | 4/2013 | Fuhge | E05F 15/611 318/484 |
| 2013/0327070 A1 * | 12/2013 | Rees | A47F 3/0447 62/80 |
| 2015/0161835 A1 | 6/2015 | Jablokov | |
| 2015/0312964 A1 | 10/2015 | Sorenson et al. | |
| 2017/0042373 A1 * | 2/2017 | Alexander | A47J 27/21083 |
| 2017/0188741 A1 | 7/2017 | Thomas | |
| 2017/0196375 A1 * | 7/2017 | Wallinder | A47F 3/007 |
| 2017/0215231 A1 | 7/2017 | Doerk et al. | |
| 2017/0219279 A1 * | 8/2017 | Chae | F25D 29/005 |
| 2018/0103778 A1 * | 4/2018 | Olovsson | G07F 9/10 |
| 2018/0338354 A1 | 11/2018 | Bassill et al. | |
| 2019/0290021 A1 * | 9/2019 | Olesen | A47F 3/043 |

FOREIGN PATENT DOCUMENTS

| | | |
|---|---|---|
| EP | 2934242 | 11/2018 |
| GB | 2280829 | 8/1995 |
| WO | WO2005017476 | 2/2005 |
| WO | WO2015168243 | 11/2015 |

* cited by examiner

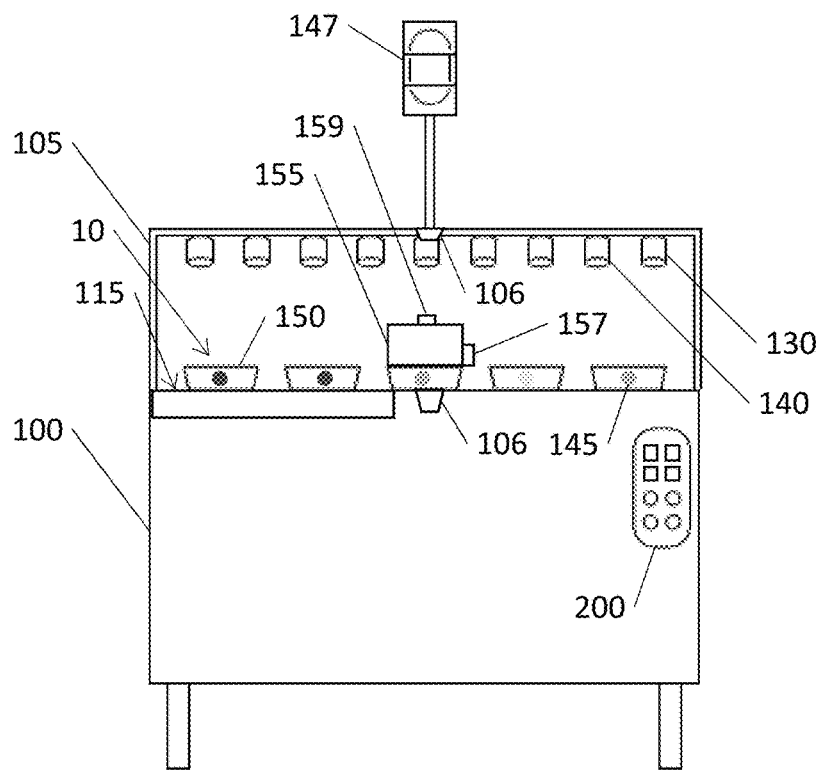
Fig. 1
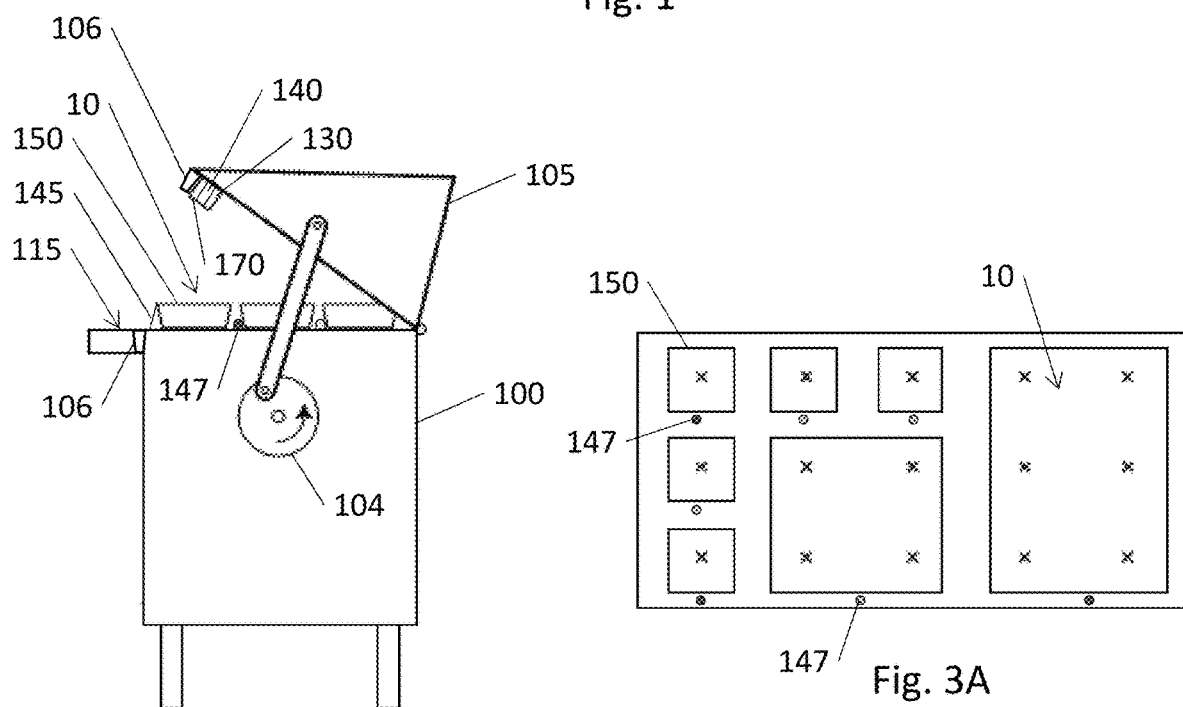
Fig. 2
Fig. 3A

TEMPERATURE MONITORING AND CONTROL SYSTEM

CROSS-REFERENCE TO RELATED APPLICATIONS

This application claims priority pursuant to 35 U.S.C. 119(e) to U.S. Provisional Patent Application Ser. Nos. 62/549,769, filed Aug. 24, 2017 and titled Touchless Food Temperature Monitoring System, 62/629,782, filed Feb. 13, 2018 and titled Magnetic Connector, and 62/646,630, filed Mar. 22, 2018 and titled Contactless Connector System for Temperature Sensor in Commercial Kitchen Equipment, the entire disclosures of which are incorporated herein by reference.

FIELD OF THE INVENTION

The present invention relates generally to monitoring systems. More specifically, the present invention is concerned with a system for monitoring food temperature.

BACKGROUND

Maintaining proper food temperatures is critical in the food service and food sales industries. For instance, failure to maintain proper food temperatures can cause food safety issues, can reduce food quality, can increase waste, and/or can lead to failed inspections. Often, food temperatures can be maintained, with a relatively high degree of confidence, simply by storing the food in an area having a relatively constant temperature. For instance, frozen food generally remains frozen when it is stored in a freezer, chilled food generally remains chilled when it is stored in a cooler, and hot food generally remains hot when it is kept in a warmer, such as a crockpot, a warming tray, or the like. Food temperatures are more difficult to maintain, however, when the surrounding environment is maintained at a temperature that is different from the required temperature for the food.

Food prep areas are generally maintained at ambient room temperatures despite the requirement to maintain many of the associated food items at high or low temperatures. While food prep areas are not new, transitioning food prep areas from a back kitchen to the front of the restaurant has become very popular. Such food prep areas allow customers to simply glance through a glass partition at a variety of cheeses, meats, fruits, vegetables, and the like (each a "topping"), thereby providing customers with a variety of choices. This model has become so prevalent and competitive that customers have begun to expect large numbers of choices. These same customers also want to be able to easily see each topping and further continue to expect fast service. Consequently, the toppings are rarely covered (often toppings have no lids while other times lids are left off of toppings for long periods of time for convenience and/or by mistake), leaving them exposed to ambient temperature air for long periods of time, increasing the chances that the temperature of one or more topping will become unsafe. The higher the ambient temperature, the greater the risk.

As a quantity of food items within a bin is depleted, operators will either refill or replace the bin. In either case, food products that have been exposed to ambient air for some time are typically mixed with new food products, thereby increasing the amount of time before the original food is served and decreasing the amount of time the new food will become unsafe. In some circumstances, the new bin is stored in a chiller or a warmer, as the case may be, prior to being moved to the food prep area. In some such circumstances, the food within the bin has already warmed (or chilled as the case may be) due to a malfunction in one or more system, due to a lid being left off for too long, due to an operator simply mishandling the food item (such as leaving the food item out for too long prior to moving it to a cooler, to a warmer, and/or to the food prep area), and/or for a number of other reasons. In some such circumstances, the food item is at a much higher risk of reaching an unsafe and/or undesirable temperature prior to being served and/or may reach an unsafe and/or undesirable temperature prior to even being moved to a food prep area.

Although the growing popularity of "front-of-store" food prep areas and the growing number of topping choices provided by restaurants has exacerbated an existing problem with food prep areas, traditional food storage and food display methods have their own risks. For instance, seafood and butcher shops often store food in cooled display cases. As long as the food remains in the case, the temperature of the food is relatively predictable. Even if the temperature of the cooler is somewhat elevated, a simple calculation can be utilized to predict when food within the cooler will reach an unsafe and/or undesirable temperature. Unfortunately, customers who remove items from such cases often return them, such as if they later change their minds for any of a number of reasons. Consequently, frozen crab legs, a package of steaks, or any number of other food items may be outside of the display cooler for several minutes or even hours before they are returned by a customer or an employee.

The safest way to ensure that toppings and other food items remain at a safe temperature is to monitor the temperature of each food item. Traditional methods of monitoring temperatures includes manually probing the food to check the temperature of the food. Such processes can result in cross-contamination of food. Consequently, it would be beneficial to have a system for monitoring temperatures that utilized temperature sensors that did not risk cross-contamination.

Traditional methods of monitoring temperatures are labor intensive and time consuming. Furthermore, traditional methods rely on the diligence of an operator to measure the temperature, the judgment of the operator to make the correct decision based on the measurement, and the confidence of the operator to take appropriate action when necessary. If the operator is not properly trained or is somehow distracted, food may be allowed to reach an unsafe temperature, requiring such food to be discarded. In even worse situations, food that should be discarded may be served to customers instead. Consequently, it would be beneficial to have an automated system for monitoring temperature of food items and/or a system for continuously or in real time monitory temperature of food items. Furthermore, it would be beneficial to have an automated system that is capable of providing a warning or alert to a user if a food item is approaching or has reached an unsafe temperature. Furthermore still, it would be beneficial to have an automated system that is capable of taking action to stabilize and/or improve food temperature and/or to ensure that unsafe food is discarded or otherwise prevent a user from serving food at an unsafe temperature.

SUMMARY

The present invention comprises a monitoring system in data communication with one or more means of obtaining temperature information, such as a thermal imaging camera, one or more temperature sensor(s), or the like (each a "temperature sensing device"). The monitoring system interprets temperature data received from the temperature sensing device(s) to determine whether one or more item, such as a food item (or an area/bin/container in which one or more item is located), is (or likely is) outside of a preferred temperature range and/or an allowed temperature range. If an item is (or likely is) outside of a preferred temperature range but still within an allowed temperature range for a determined or specified period of time (or in some embodiments, simply upon crossing the threshold temperature), the monitoring system causes a warning to be provided to a user and/or causes one or more action to occur in an effort to stabilize and/or improve the temperature of the item. If the item is (or likely is) outside of the allowed temperature range for a determined or specified time period (or in some embodiments, simply upon crossing the threshold temperature), a control system of the present invention causes an alert to be provided to a user and/or causes one or more action to occur in an effort to ensure that the item is discarded and/or to otherwise prevent the item from being used and/or served.

Some embodiments of the present invention use one or more touchless temperature sensing device, such as an infrared temperature sensor or any other touchless temperature sensing device now known or later developed. In this way, the temperature of numerous items can be detected without risking cross-contamination of the items. In some embodiments, one or more dedicated temperature sensing device is utilized to minimize cross contamination of food or other items. Some embodiments of the present invention include temperature sensors molded into pans, bins, or the like, temperature sensors printed onto or otherwise coupled to pans, bins, or the like, and/or any other temperature sensor that is configured to obtain temperature information associated with one or more pan, bin, item, product, or the like. In some embodiments, each temperature sensing device is configured, positioned, and oriented so as not to interfere with movement of the one or more sensed item and/or one or more item associated with the same, or not to otherwise interfere with or impede the ability to manipulate, serve, stir, load/unload, visually identify, etc., the items. In some embodiments, the system is a food prep table system and each temperature sensing device is positioned and oriented so as to not obstruct preparation of food. In some embodiments, the monitoring system includes a recording protocol for recording data received by the one or more temperature sensing device. In some such embodiments, the monitoring system further includes a control protocol for opening or closing a hood, lid, or the like, for directing a temperature sensing device to take a reading, to cause a temperature system to be repositioned, reconfigured, and/or reoriented (such as for taking a temperature reading of a desired item and/or a desired location on an item), or the like.

In some embodiments, the temperature sensor is incorporated into one or more bin, lid, or other item, such as a stirring device, a serving device, or the like. In some such embodiments, the temperature sensor is a temperature probe requiring contact with and/or close proximity to the item being measured. In some embodiments, a temperature probe or other contact temperature sensor is utilized in combination with other temperature sensor(s) or imaging devices of the inventive concept. In some such embodiments, one or more temperature probes (or other contact sensors) are used periodically, and manually, to inspect the central temperature of food items ("central probing") as required for compliance with food safety inspection procedures, such as required in Hazard Analysis Critical Control Point (HACCP) plans. Such central probing is utilized in combination with the continuous/real-time monitoring and/or control system of the inventive concept. In some such embodiments, the central probing temperature sensor is a separate sensor to the one or more sensors or thermal imaging devices that are utilized to continuously monitor and/or control the temperature of items maintained within the system. In other embodiments, the central probing temperature sensor is utilized both for the manual/periodic central probing and also for use in the continuous/real-time monitoring. In that manner, the system of the inventive concept allows an easy mechanism for compliance with food safety requirements, while at the same time monitoring and/or control temperature to help ensure food items stay in compliance with food safety requirements. In some embodiments, the system of the inventive concept records/logs central probing temperature readings, time, date, type of item, location, etc., as well as similar data regarding the continuous monitoring and control activities.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION

A preferred embodiment of the invention, illustrative of the best mode in which the applicant has contemplated applying the principles, is set forth in the following description and is shown in the drawings and is particularly and distinctly pointed out and set forth in the appended claims.

FIG. 1 is a front elevation view of a system of the present invention.

FIG. 2 is a side elevation view of a system of the present invention.

FIG. 3A is a schematic depicting sensor read locations and sensor groupings.

DETAILED DESCRIPTION

Figure 3B:
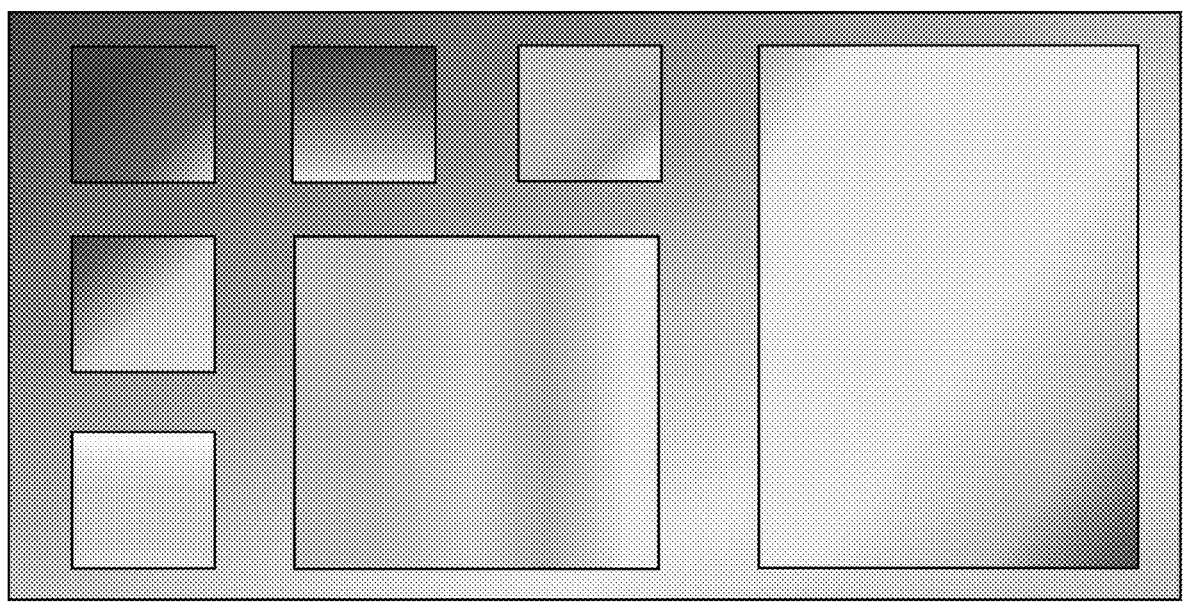
FIG. 3B is a schematic depicting a thermal imaging map associated with certain embodiments of the present invention.

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIG. 1, some embodiments of the present invention include a base 100 defining an interior area for holding one or more item, substance, or the like (each being a "topping" 10), such as one or more food item or the like. In some embodiments, the interior area of the base 100 is defined by a plurality of side walls extending vertically from a bottom panel. In some embodiments, the base 100 defines a top opening for viewing and/or accessing one or more topping 10. In some such embodiments, the base 100 defines a generally open top. In some embodiments, the base includes one or more rail and/or supports one or more rail. In some embodiments, the base includes and/or supports one or more raised rail, recessed rail, or the like. In some embodiments, one or more rail defines a first opening with divider bars configured for receiving one or more pan, bin, or the like. In some embodiments, one or more rail is in thermal communication with one or more thermal system. In some embodiments, one or more rail is divided into separate compartments. In some embodiments, one or more rail defines a single compartment.

In some embodiments, the present invention utilizes one or more container, such as a tray, a tub, a bucket, a bin, or the like (each a "bin" 150). Each bin 150 defines an interior area for holding one or more topping 10. In some embodiments, the interior area of each bin 150 is defined by a plurality of side walls extending vertically from a bottom panel. In some embodiments, each bin 150 defines a top opening for viewing and/or accessing one or more respective topping 10. In some embodiments, the base 100 is configured to hold a plurality of bins 150 such that a top opening of each bin 150 is positioned adjacent to and/or is accessible through the top opening of the base 100. In some embodiments, at least some bins are configured to extend through the top opening of the base 100.

In some embodiments, the base 100 includes a base lid 105 that is moveable between an open configuration and a closed configuration. When the base lid 105 is in the open configuration, toppings within the base 100 are visible and accessible, such as through a top opening of the base 100. When the base lid 105 is in the closed configuration, toppings within the base 100 are inaccessible. In some embodiments, the base lid 105 is formed at least partially from a transparent material, such as glass or plastic, such that toppings within the base 100 are visible regardless of whether the base lid 105 is in the open or closed configuration.

In some embodiments, the base 100 includes a drive system 104 mechanically coupled to the base lid 105 such that the drive system 104 is capable of moving the base lid 105 between its open and closed configurations. In some embodiments, the base 100 includes a locking system 106 for securing the base lid 105 in its closed configuration and/or for otherwise inhibiting the base lid 105 from moving away from its closed configuration. In some embodiments, the system of the present invention includes a control system for controlling a configuration of the base lid 105, such as by controlling the drive system 104 and/or the locking system 106 of the base 100.

In some embodiments the base 100 is a heated base, a chilled base, or the like. In some embodiments, the control system is configured to control the configuration of the base lid 105 so as to control a temperature inside the base 100 and/or to control a temperature of a topping 10 associated with the base 100. In some embodiments, the control system is configured to control the configuration of the base lid 105 so as to inhibit or allow access to one or more bin 150 and/or topping 10 associated with the base 100.

In some embodiments, one or more bin 150 of the present invention includes a bin lid 155 that is moveable between an open configuration and a closed configuration. When the bin lid 155 is in the open configuration, toppings within the bin 150 are visible and accessible, such as through a top opening of the bin 150. When the bin lid 155 is in the closed configuration, toppings within the bin 150 are inaccessible. In some embodiments, the bin lid is formed at least partially from a transparent material, such as glass or plastic, such that toppings within the bin 150 are visible regardless of whether the bin lid 155 is in the open or closed configuration. In some embodiments, at least a portion of the bin 150 and/or the bin lid 155 is at least partially transparent or at least partially translucent.

In some embodiments, the base 100 and/or one or more bin 150 includes a means of moving the bin lid 155 between its open and closed configurations. In some embodiments, the means of moving the bin lid 155 includes one or more robotic arm, actuator, spring member, or the like (each a "drive system" 157). In some embodiments, the base 100 and/or one or more bin 150 includes means of securing one or more bin lid 155 in a respective open or closed configuration and/or for otherwise inhibiting one or more bin lid 155 from moving away from a respective closed or open configuration (each a "locking system" 159). In some embodiments, the control system of the present invention is configured to control a configuration of one or more bin lid 155, such as by controlling the drive system 157 and/or the locking system 159.

In some embodiments one or more bin 150 is a heated bin, a chilled bin, or the like. In some embodiments, a first bin associated with a first base is a heated bin and a second bin associated with the first base is a chilled bin. In some such embodiments, the base is a heated base. In other such embodiments, the base is a chilled base. In still other such embodiments, the base is neither heated nor chilled. In some embodiments, a third bin associated with the first base is neither heated nor chilled. In some embodiments, the first bin is one of a heated bin and a chilled bin and the second bin is neither heated nor chilled. In some embodiments, the control system is configured to control the configuration of one or more bin lid 155 so as to control or otherwise influence a temperature inside the respective bin 150 and/or to control or otherwise influence a temperature of a topping 10 associated with the respective bin 150. In some embodiments, the control system is configured to control the configuration of one or more bin lid 155 so as to inhibit or allow access to one or more topping 10 associated with the same.

Some embodiments of the present invention include a rail system for supporting one or more bin 150 and/or item 10. In some embodiments, the rail system defines a channel for holding one or more fluid for transferring to and/or away from one or more bin 150 and/or topping 10, thereby providing temperature control for the same or otherwise influencing temperature of the same. In some embodiments, one or more surface of the rail system is a chilled surface and/or a heated surface. In some embodiments, rail system is configured so as to cause or otherwise allow fluid to circulate through the channel, to otherwise allow fluid to flow past one or more bin 150, and/or to otherwise influence heat transfer to and/or from one or more bin 150, thereby assisting in the maintenance and/or adjustment of temperatures associated with the same.

Some embodiments of the present invention include a prep surface 115. In some embodiments, the prep surface 115 extends from the base 100 or is otherwise positioned in close proximity to the base 100. In some embodiments, the prep surface 115 is positioned on a back side of the base so as to provide a work surface for preparing sandwiches, burritos, salads, and the like. In some embodiments, the prep surface 115 includes a temperature-controlled area, such as a chilled area and/or a heated area. In some embodiments, the prep surface 115 includes a first heated area, a second chilled area, and/or a third area that is neither heated nor chilled.

In some embodiments, the present invention includes one or more temperature control system, such as a heating system and/or a cooling system. In some embodiments, the temperature control system includes one or more tube or other structure for circulating a thermal fluid, thereby enabling the transfer of thermal energy to and/or away from one or more surface, structure, or item, or the like. In some embodiments, the temperature control system is configured to draw heat energy away from one or more topping 10 and/or bin 150 by cooling the thermal fluid prior to circulating the same. In some embodiments, the temperature control system is configured to add heat energy to one or more topping 10 and/or bin 150 by heating the thermal fluid and/or by otherwise transferring heat energy to one or more bin 150 and/or topping 10. In some embodiments, the temperature control system is configured to cool one or more topping 10 and/or bin 150 by cooling the thermal fluid and/or by otherwise transferring heat energy away from one or more bin 150 and/or topping 10. In some embodiments, the temperature control system is configured to maintain a temperature of one or more topping 10 and/or bin 150 by cooling and/or heating the thermal fluid, as required, and/or by otherwise transferring heat energy to and/or away from one or more bin 150 and/or topping 10.

In some embodiments, the base 100 includes a sneeze guard and/or one or more other feature (each a "sneeze guard") for protecting toppings 10 from inadvertent exposure to contaminants or the like and/or to prevent or otherwise hinder air from flowing into or past one or more bin 150, topping 10, surface, or the like. In some embodiments, the sneeze guard protects the interior area of the base 100 and/or one or more area of the prep surface 115. In some embodiments, the sneeze guard is supported by a support structure extending from and/or positioned adjacent to one or more base 100 of the present invention. In some embodiments, the support structure includes a plurality of vertical stanchions for supporting a plurality of support beams, panels, and/or other structures vertically displaced from a top opening of the one or more relative base 100.

In some embodiments, the sneeze guard is at least partially transparent so as to enable a customer or other individual to view toppings through the sneeze guard. In some embodiments, the sneeze guard and/or the support structure includes at least part of a base lid 105 and/or is configured so as to allow at least part of a base lid 105 to move between its closed and opened position.

The system of the present invention further includes one or more temperature sensor 130 for sensing temperature of one or more topping 10. In some embodiments, a plurality of temperature sensors 130 are positioned relative to a plurality of respective toppings 10, each sensor 130 being displaced from a respective topping 10. In some embodiments, each sensor 130 is an infrared sensor or some other type of sensor now known or later developed that is capable of sensing a temperature value without requiring physical contact with such topping. In some embodiments, one or more temperature sensor 130 is secured to the base 100, the base lid 105, a support structure, a sneeze guard, a bin lid 155, or the like.

In some embodiments, the present invention includes a first set of sensors for sensing a temperature value associated with one or more topping 10, such as a temperature of at least a portion of the topping 10, a temperature value associated with a respective bin 150, and/or a temperature value associated with a respective base 100. In some embodiments, the system is configured to obtain one or more temperature value associated with ambient air inside and/or outside a base 100, fluid temperature associated with one or more cooling system associated with the base 100, temperature associated with one or more surface of the base 100 and/or one or more bin 150 associated with the base 100, and/or a temperature associated with one or more other structure or fluid, such as a prep surface, a sneeze guard, a cleaning fluid, or the like.

In some embodiments, each sensor is directed to a predetermined area, such as in the direction of a bin 150, a prep surface 115, or the like. In some embodiments, one or more temperature associated with a condenser coil, a base, a rail, and/or fluid (such as air and/or water) associated with any of the same. In some embodiments, a control system of the present invention is utilized to position and/or align one or more temperature sensor. In some embodiments, a control system is configured to assist positioning and/or alignment of one or more sensor 130 by one or more inspector, manager, worker, maintenance personnel, or the like. In some embodiments, the system is configured to obtain real-time temperature information from one or more sensor and provide such information to at least one of a user of the system, an inspector or other quality-control personnel associated with the system, a manager or other supervisor associated with the user of the system, a customer of items associated with the system, or the like. In some embodiments, the system includes one or more processor for receiving, comparing, storing, deriving, or otherwise processing the information and one or more database for storing threshold values, current and historical temperature values, desired temperature values, algorithms for predicting future temperature values, or the like.

In some embodiments, the system includes a means for displaying information, such as a display panel or the like (a "display panel" 200). In some embodiments, the display panel 200 is attached to the base 100 and/or is otherwise positioned in close proximity to the base 100 so as to provide information to a worker, a customer, maintenance personnel, or the like. Referring to FIGS. 4-9, some embodiments of the display panel 200 are configured to display a plurality of screens for providing a variety of information.

Figure 4:
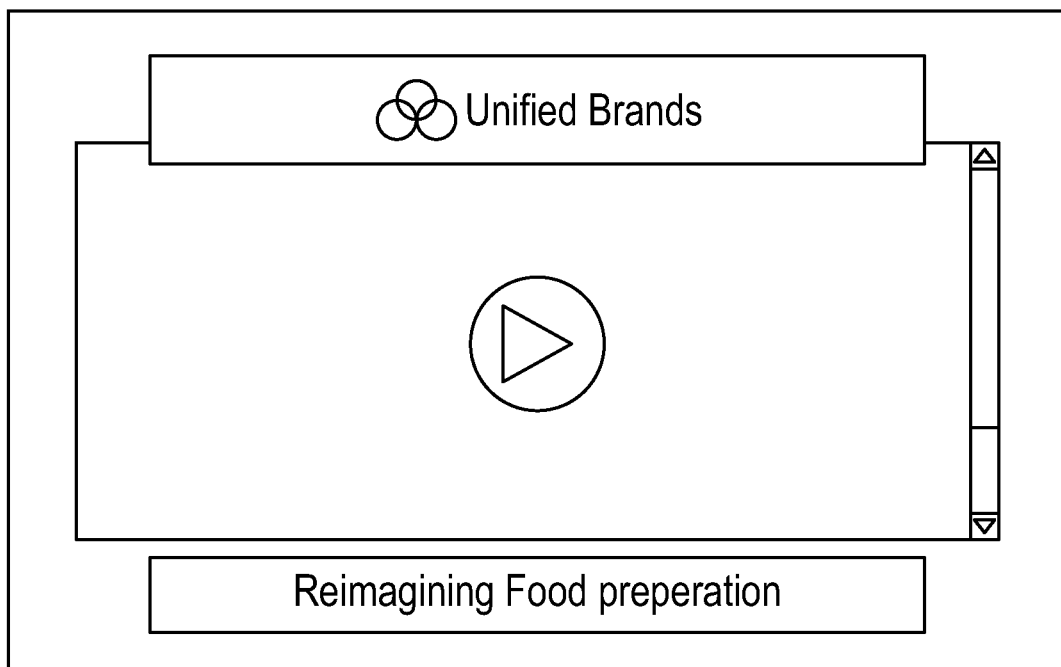
FIG. 4 is a graphic user interface display showing an opening screen associated with the system of the present invention.

Referring to FIG. 4, some embodiments of the present invention are configured to display a first screen, such as an opening screen. In some embodiments, the opening screen is configured to display trademark information associated with a producer of the base, a developer of associated software, a training company, a restaurant using the base, or the like (each being an "associated company"). In some embodiments, the opening screen is configured to show a first set of information in the foreground and a second set of information in the background. In some embodiments, the first or second set of information is a scrolling promotional video, such as a video promoting one or more associated company and/or otherwise providing information associated with the same.

Figure 5:
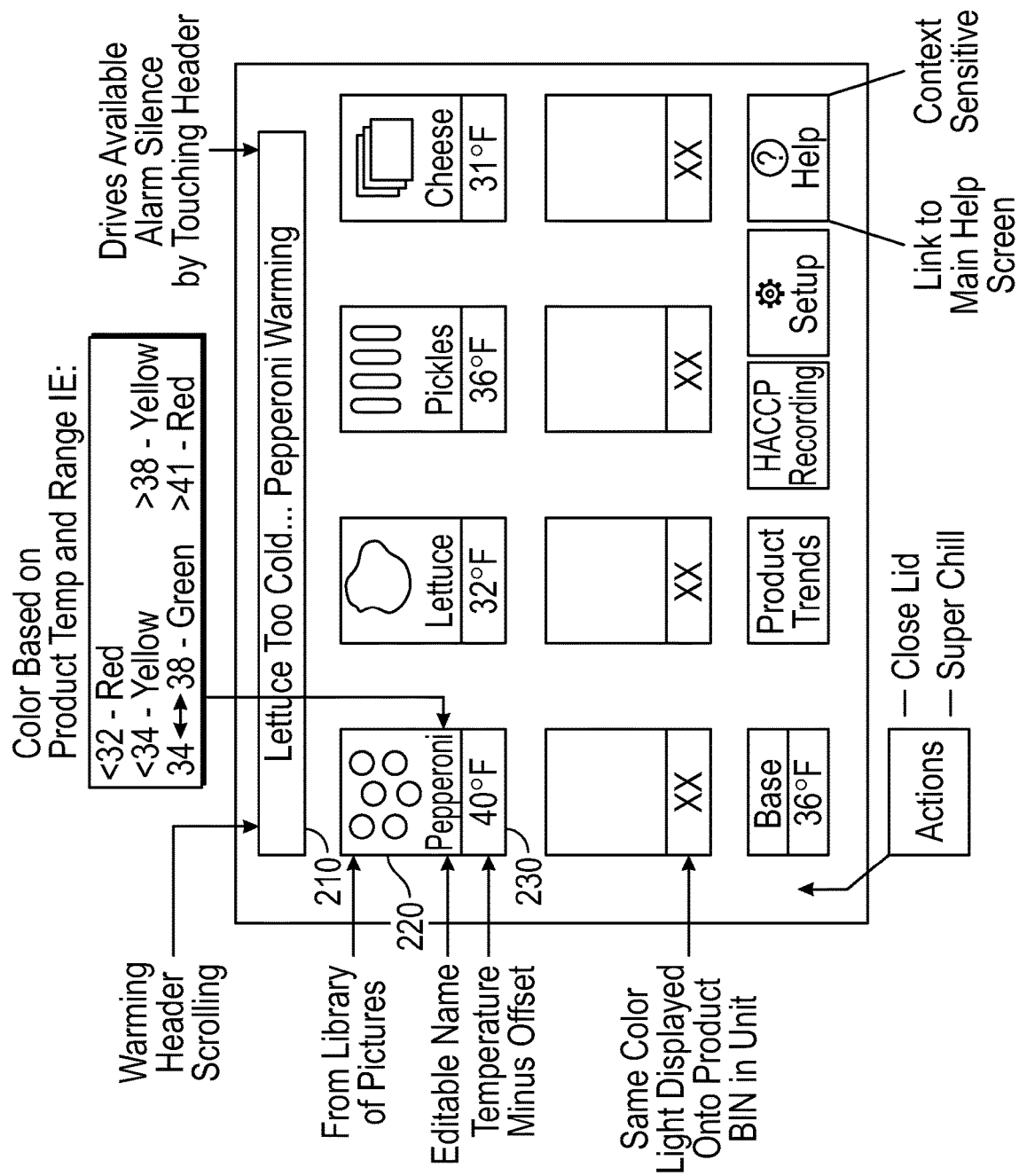
FIG. 5 is a graphic user interface display showing a default screen associated with the system of the present invention.

Referring to FIG. 5, some embodiments of the present invention are configured to display a default screen or the like. In some embodiments, the default screen includes one or more indication associated with one or more topping, system, or surface associated with the base 100. In some embodiments, an indication area is configured as a banner, a large icon, or the like (each being a "banner" 210). In some embodiments, the banner is positioned near a top of the screen or is otherwise conspicuously positioned so as to attract attention. In some embodiments, the banner 210 is configured to display a variety of information, such as an indication of one or more temperature being out of range and/or an indication that one or more heat transfer operation has commenced, will commence, and/or has completed. In some embodiments, information scrolls along the banner 210 and/or such information is otherwise dynamically displayed, such as by periodically replacing a first set of information with sequential second, third, and fourth sets of information prior to replacing a final set of information with the first set of information and/or one or more other set of information. In some embodiments, the system is configured to dwell on a first set of information longer than a second set of information in the event that the first set of information is more critical than a second set of information.

In some embodiments, the banner 210 is associated with an alarm, such as an audible alarm, a flashing light, bold type, colored regions, or the like. In some embodiments, the alarm is triggered by a first event, such as the detection of one or more temperature being out of a first or second range, a topping being contaminated or mislocated, a bin being removed or mislocated, or the like (each an "event" or an "issue"). In some embodiments, a first alarm associated with the banner 210 is a local alarm alerting a worker, a customer, or another individual in the area of a potential issue. In some embodiments, the display device includes a touch screen and at least a portion of the banner 210 serves as a virtual button for enabling user interface with the system of the present invention. In some embodiments, the system includes one or more means of silencing or otherwise addressing the first alarm, such as by touching the banner 210 and/or selecting one or more other feature or function associated with the alarm. In some embodiments, the system distinguishes a first alarm from a second alarm, the first alarm requiring a first action (such as selecting the banner) to silence the alarm and the second alarm requiring a second action (such as closing the lid and initiating a super cooling mode, replacing a topping, input of a manager's code, or the like) for silencing the second alarm. In some embodiments, the first alarm indicates a temperature is about to exceed and/or fall below one or more threshold value (or that the value is outside of a preferred range) while a second alarm indicates a temperature has exceeded and/or has fallen below one or more threshold value, such as when the temperature is outside of a required range.

In some embodiments, the system is configured to execute one or more super-cooling mode. In some embodiments, a super-cooling mode includes energizing one or more fan, diverting additional refrigeration to one or more localized area, or the like. In some embodiments, a super-cooling mode includes temporarily starving a first area of refrigeration (such as a localized area that is not at risk of exceeding a temperature threshold) and redirecting such refrigeration to a second area (such as a localized area that is at risk of exceeding one or more temperature threshold). In some embodiments, the system is configured to execute one or more super-chill mode. In some embodiments, the system is configured to temporarily increasing power to one or more cooling system and/or otherwise temporarily increasing cooling associated with the system during one or more super-chill mode. In some embodiments, the system is configured to separate one or more localized area from ambient air during a super-cooling and/or super-chill mode.

Still referring to FIG. 5, some embodiments of the default screen include a plurality of indication areas, such as a plurality of icons or the like (each an "icon" 220). In some embodiments, each icon 220 includes a visual indicator of a topping 10, surface, system, screen, or the like associated with the icon 220. In some embodiments, the visual indicator is graphic, such as a picture and/or other graphical representation of a food item, a system, or the like. In some embodiments, the visual indicator is an alpha-numeric indicator, such as a name, an abbreviation, or the like. In some embodiments, at least a portion of the icon 220 is editable. In some such embodiments, a graphic portion and/or alpha-numeric portion of the icon is selected and/or selectable from one or more library associated with the system. In some embodiments, one or more portion of the icon 220 is editable.

In some embodiments, at least some icons 220 are associated with a function or action, such as an action for closing or opening a base lid, a bin lid, or the like, initiating, ending, and/or adjusting a heating function, a cooling function, stirring function, or the like, and/or some other function and/or action associated with the present invention (each an "action"). In some embodiments, at least a portion of the icon 220 serves as a virtual button for enabling user interface with the system, thereby enabling the user to elect to initiate, end, and/or adjust one or more action.

Still referring to FIG. 5, some embodiments of the default screen include a plurality of display areas for displaying real-time information and/or one or more threshold information (each being a "temperature display" 230). In some embodiments, each temperature display 230 is configured to display a real-time temperature reading associated with one or more monitored topping 10, bin 150, surface, system, ambient air, or the like. In some embodiments, one or more real-time temperature reading represents a precise monitored temperature value, thereby representing a measured temperature value. In some embodiments, one or more real-time temperature reading is adjusted up or down by an offset number, thereby representing an adjusted temperature value. In some embodiments, the measured temperature value is adjusted to account for one or more uncertainty and/or to otherwise account for anticipated and/or calculated changes in temperature. In some embodiments, the temperature display 230 is configured to provide an indication of whether a temperature value is outside one or more threshold value. In some such embodiments, the temperature display 230 is configured to be green if the measured and/or adjusted temperature is within a preferred temperature range, yellow if the measured and/or adjusted temperature is outside of the preferred temperate range but within a required temperature range, and red if the measured and/or adjusted temperature is outside of the required temperature range. In some embodiments, each temperature display 230 is positioned adjacent to a respective icon 220.

Figure 6:
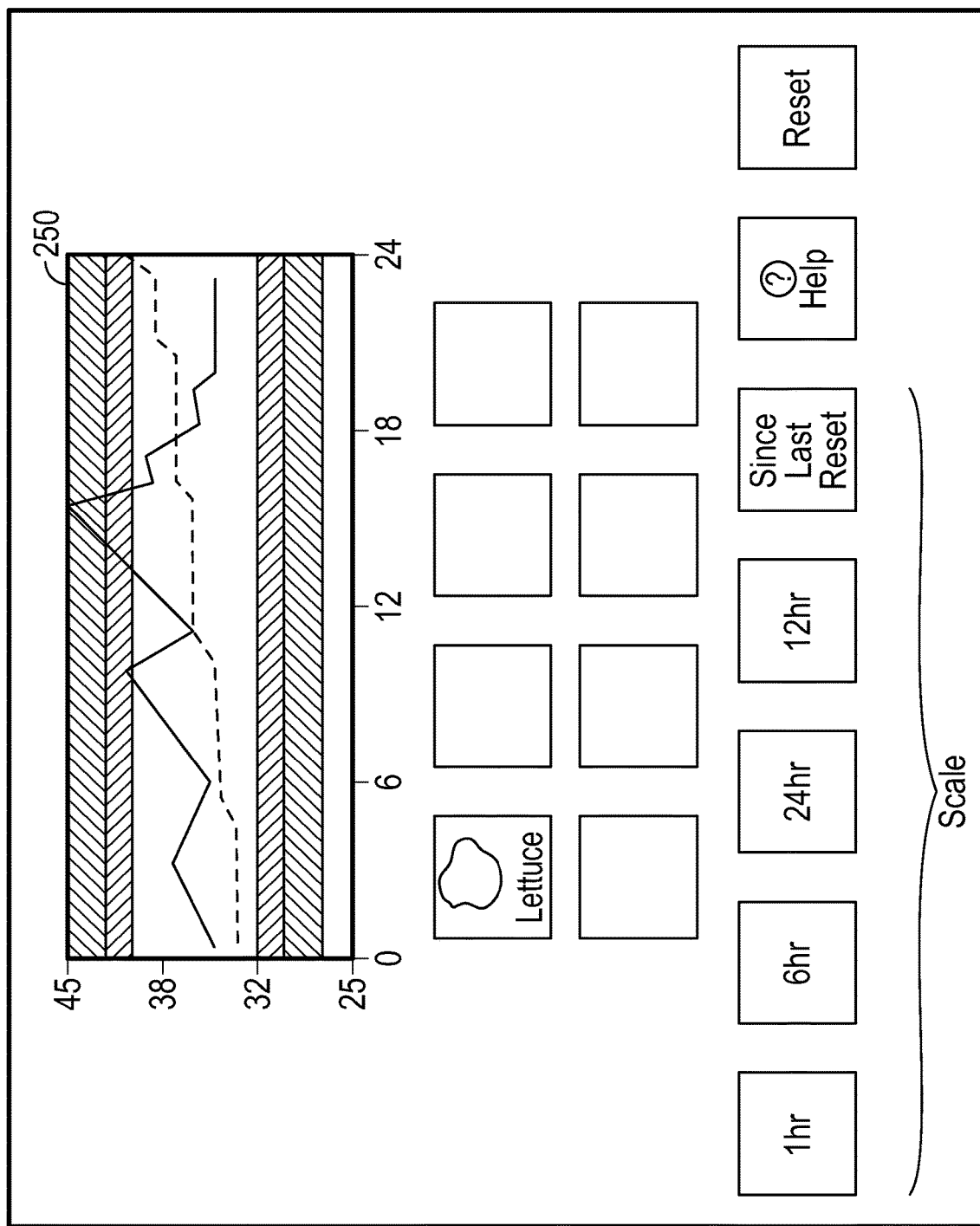
FIG. 6 is a graphic user interface display showing a trend screen associated with the system of the present invention.

Referring to FIG. 6, some embodiments of the present invention are configured to display a product trend screen or the like. In some embodiments, the product trend screen includes a chart 250 for showing measured and/or adjusted temperature values over time for one or more monitored item. In some embodiments, the product trend screen includes a plurality of icons associated with one or more monitored item, one or more time range, one or more action, or the like. In some embodiments, the system is configured to display a chart 250 for a first monitored item upon a user selecting an icon associated with the first item, such as an icon displayed on the product trend screen, the default screen, or elsewhere. In some embodiments, the chart provides an indication of one or more threshold value and/or range, such as one or more line or other feature representing each such threshold value and/or range. In some embodiments, the chart displays a first color, such as green, associated with a first preferred range, a second color, such as yellow, associated with a portion of a required range that is outside of the preferred range, and a third color, such as red, associated with values outside of the required range.

Figure 7:
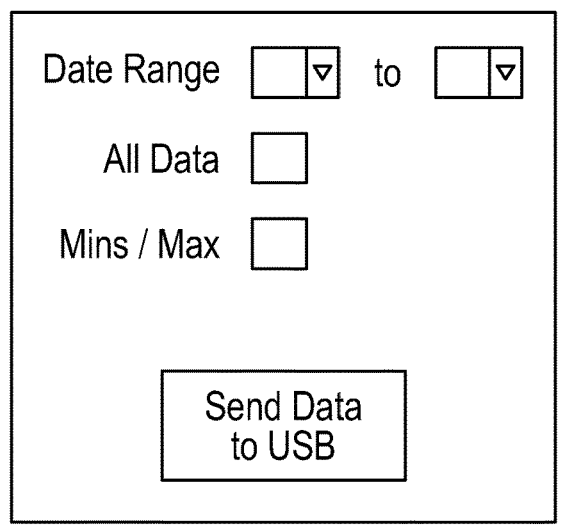
FIG. 7 is a graphic user interface display showing an input screen associated with the system of the present invention.

Referring to FIG. 7, some embodiments of the present invention are configured to display an interface screen for allowing a user to indicate a date range for obtaining and/or exporting stored information. In some embodiments, the system is configured to allow a user to export and/or delete all data associated with one or more date range and/or to export just minimum and maximum values associated with the same.

Figure 8:
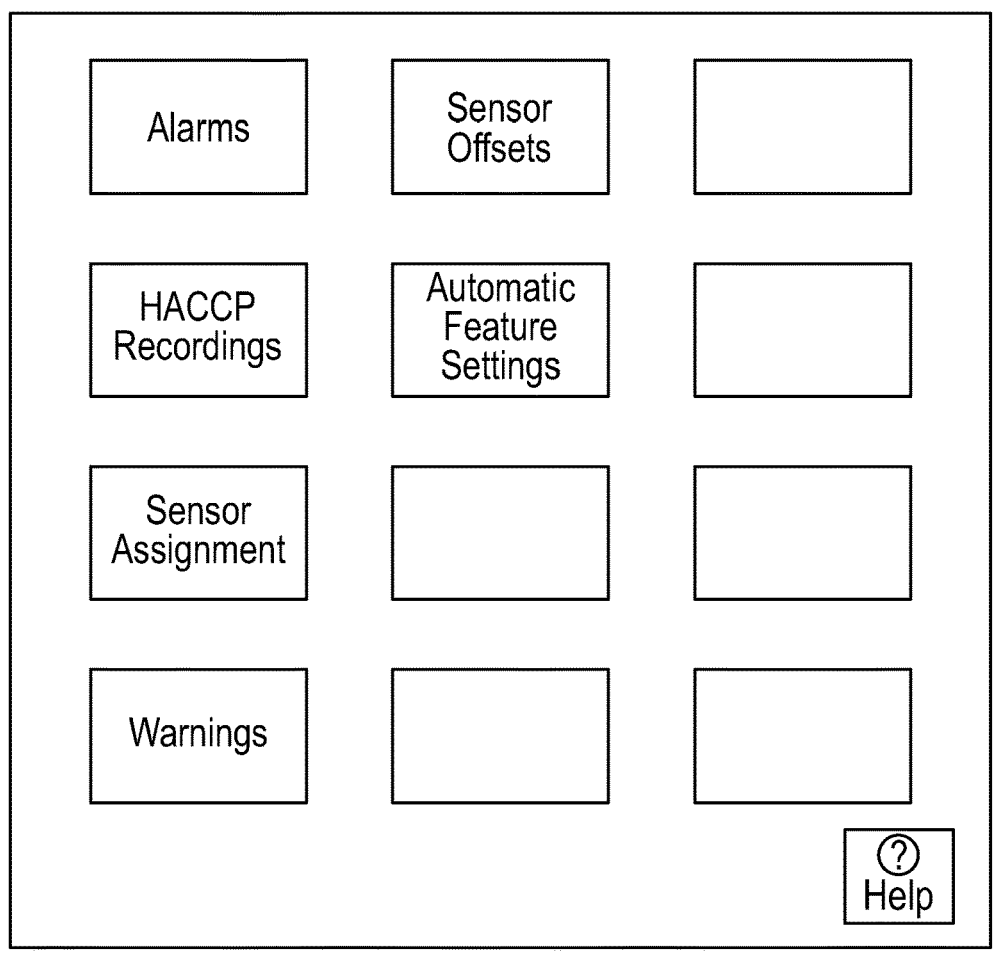
FIG. 8 is a graphic user interface display showing a set-up screen associated with the system of the present invention.

Referring to FIG. 8, some embodiments of the present invention are configured to display a set-up screen. In some embodiments, the set-up screen displays a plurality of icons 220 for allowing a user to create, adjust, delete, initiate, or otherwise manipulate one or more action and/or feature of the present invention. In some such embodiments, one or more icon 220 of the set-up screen is associated with one or more alarm and/or warning, one or more recording and/or other recorded information, one or more sensor assignment, one or more sensor position and/or alignment, one or more feature setting, a help screen, or the like.

Figure 9:
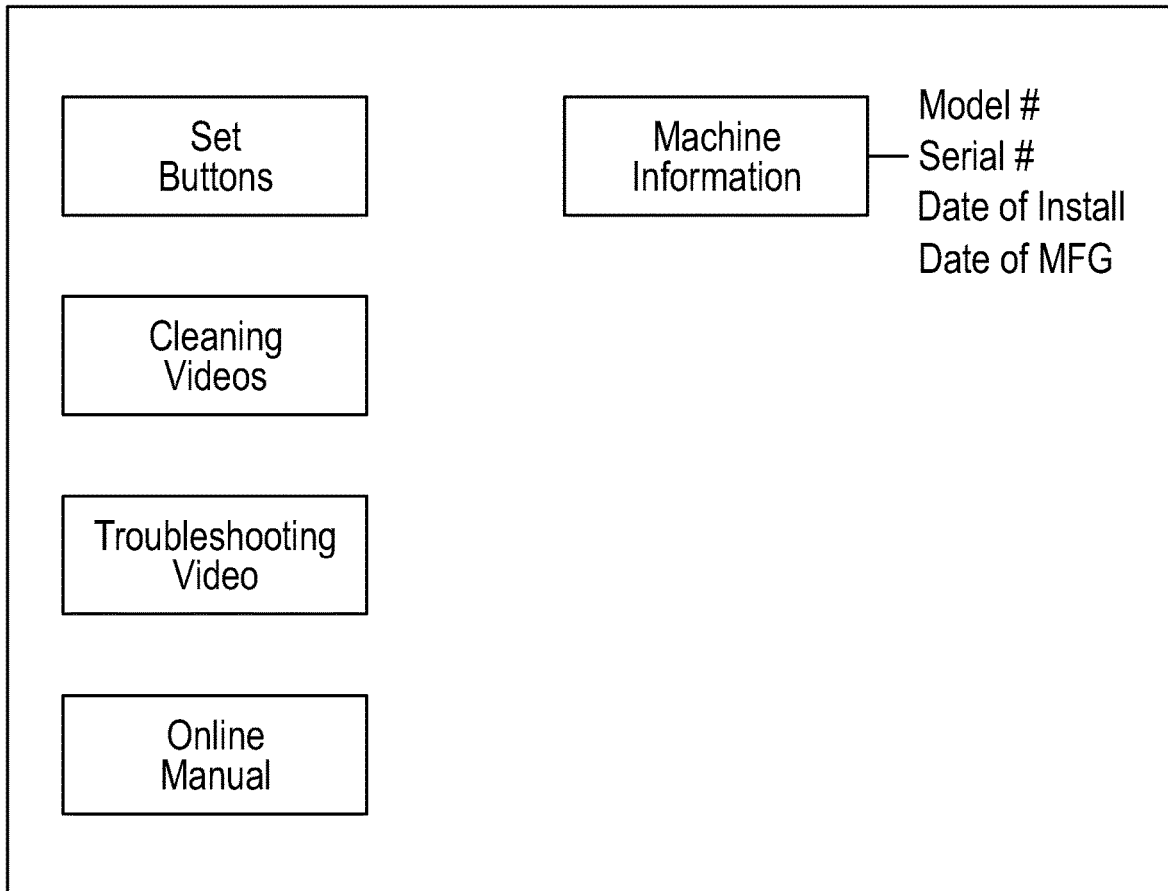
FIG. 9 is a graphic user interface display showing a help screen associated with the system of the present invention.
Figure 10A:
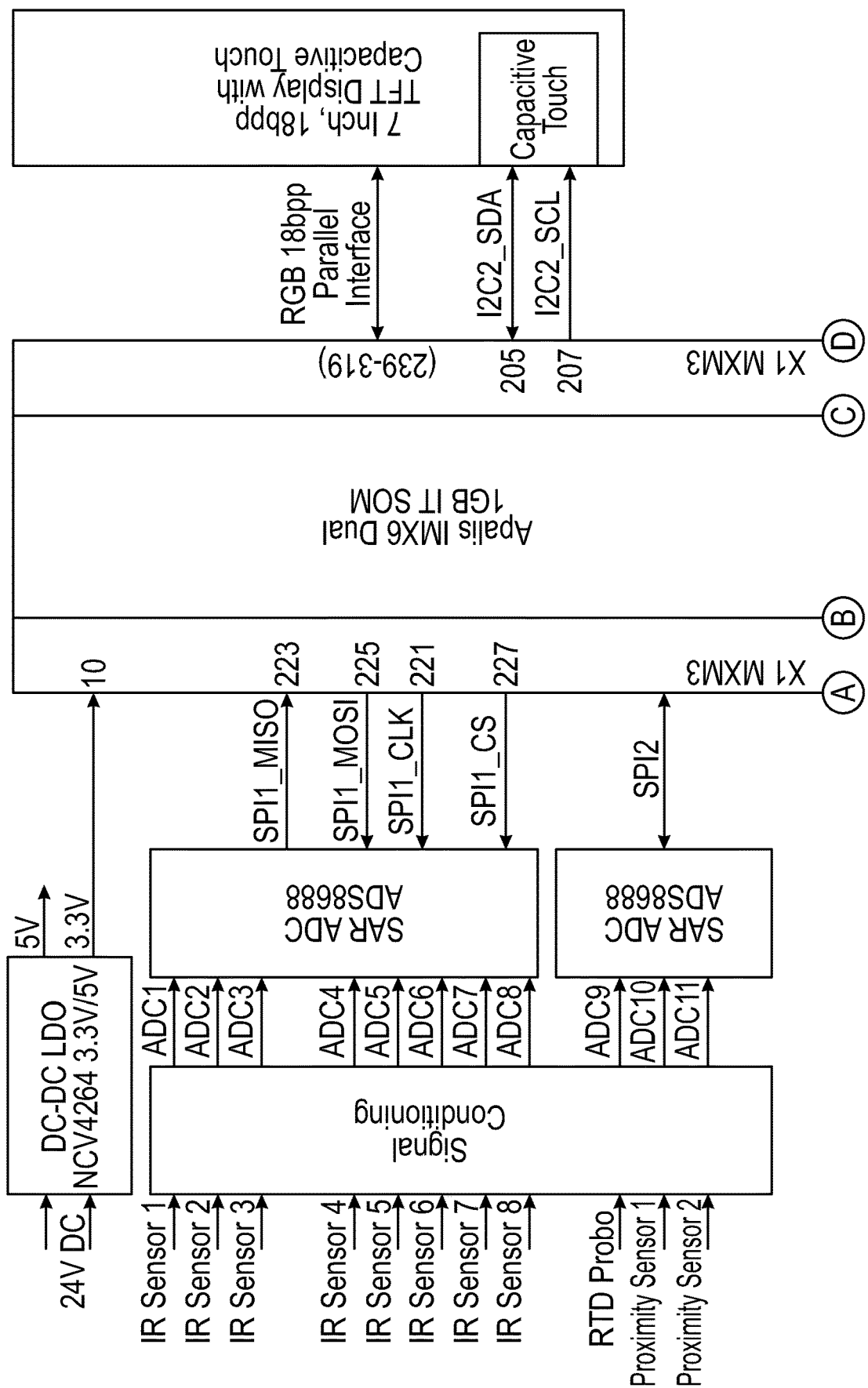
FIG. 10A is a first portion of a block-diagram for an electronic controller module of an embodiment of the present invention.
Figure 10B:
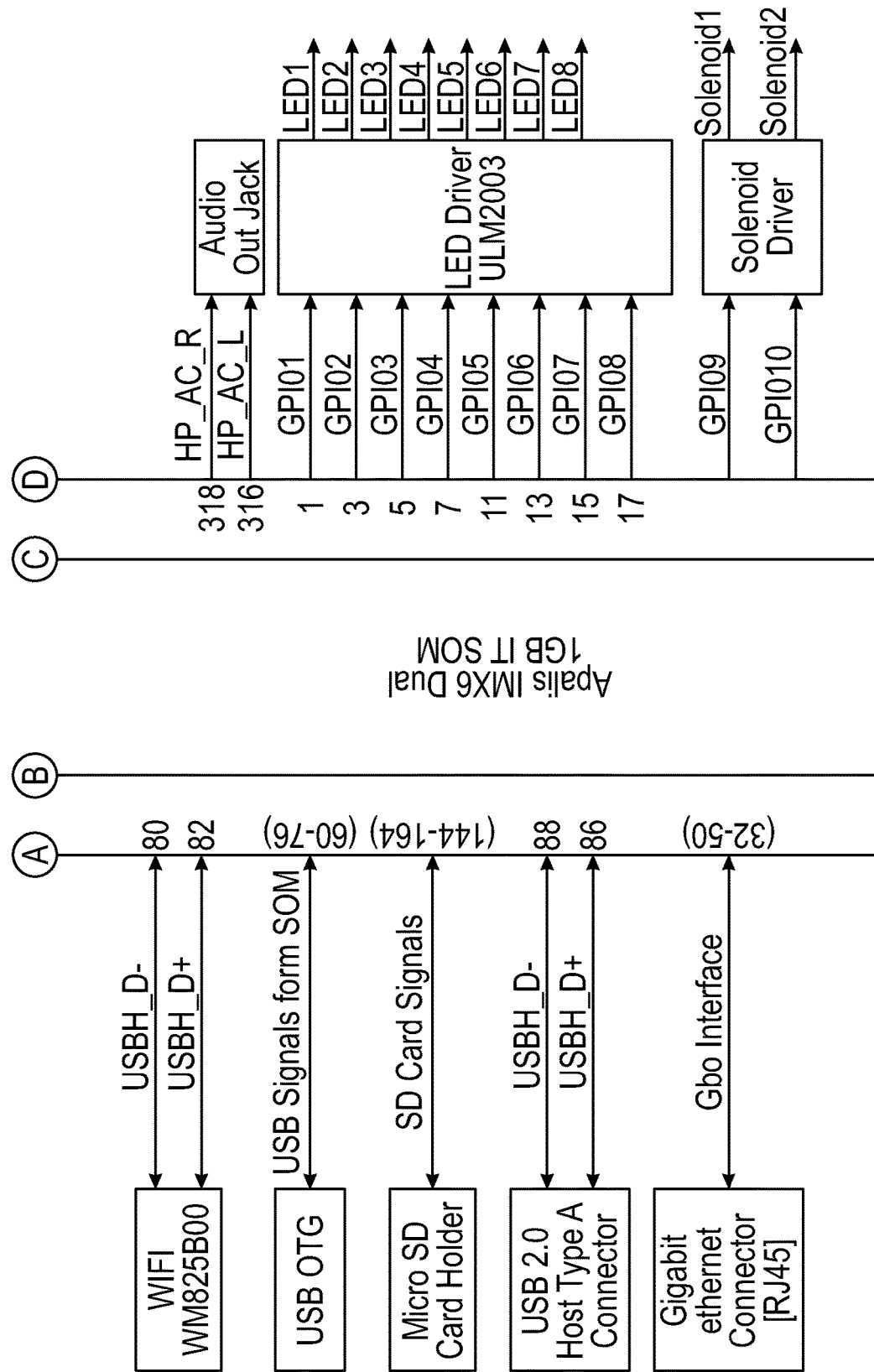
FIG. 10B is a second portion of the block-diagram of FIG. 10A.

Referring to FIG. 9, some embodiments of the present invention are configured to display a help screen. In some embodiments, the help screen displays a plurality of icons 220 for allowing a user to search for assistance in operating the system of the present invention and/or for otherwise obtaining information regarding the same. In some embodiments, one or more icon 220 of the help screen is associated with information pertaining to setting buttons, cleaning, troubleshooting, or otherwise maintaining the system, or otherwise obtaining information associated with the machine, including an online manual, model number, serial number, date of installation, date of manufacture, or the like.

In some embodiments, the system is configured to obtain ambient air temperature and one or more system temperature, such as an average temperature of air exiting a condenser or the like. In some embodiments, the system is configured to compare the ambient air temperatures with the one or more system temperature so as to predict potential changes in temperature of one or more monitored item, such as a topping 10. In some embodiments, the system is configured to provide one or more warning, alarm, and/or other indication associated with ambient and/or system temperatures. In some embodiments, the system is configured to perform one or more function, such as closing a base lid 105 of the system in the event that the ambient temperature and/or the one or more system temperature fails to fall within one or more preferred and/or required temperature range.

In some embodiments, the system includes one or more means of providing an indication associated with a temperature and/or a warning or alarm associated with one or more monitored item (herein, an "indication element" 147). In some embodiments, one or more indication element 147 is positioned at or adjacent to a respective bin 150 and/or on a respective bin 150 or otherwise positioned at or adjacent to a topping 10 or other monitored item. In some embodiments, the indication element 147 is located centrally with respect to the system to provide a general warning that the system requires attention. In some such embodiments, in which a centrally located indication element is located (e.g. above a hood), additional indication element(s) are located adjacent to a respective bin 150 and/or on a respective bin 150 or other positioned at or adjacent to a topping 10 or other monitor item, allowing a user to approach the system upon seeing the centrally located indication and determine the specific bin/item that requires attention. In some embodiments, the indication element 147 is a light, such as a multi-color light or the like. In some embodiments, a plurality of light emitting diodes or other indication elements 147 are associated with a single monitored item. In some embodiments, one or more indication element 147 is a multi-mode element, such as a multi-color light-emitting diode. In some embodiments, the system is configured to utilize one or more indication element 147 to provide an indication of one or more measured, predicted, and/or adjusted temperature falling outside of one or more respective preferred, required, or other temperature range. In some embodiments, a first indication associated, such as a single illuminated light and/or an indication associated with a first color (such as a yellow light), is utilized to indicate that a respective temperature value is not within a first range, such as a preferred range. In some embodiments, a second indication, such as multiple illuminated lights and/or an indication associated with a second color (such as a red light), is utilized to indicate that a respective temperature value is not within a second range, such as a required range. In some embodiments, a third indication is utilized to indicate that a temperature value is within the first and/or second range. In some embodiments, the indication is positioned discretely, such as on a back side of a respective bin 150, so as to be conspicuous to a worker while being inconspicuous or even concealed from a customer. In some embodiments, one or more indication is selectively configurable so as to be either conspicuous or inconspicuous to a customer, thereby providing a user of the system and/or a customer associated with the system an ability to establish a preferred indication mode. In some embodiments, one or more alarm or warning system is configured to provide an indication to a customer as well as a worker. In some embodiments, one or more quality indicator, such as a green, yellow, or red light or the like, is configured to provide an indication to a customer regarding the quality of one or more topping and/or collection of toppings.

In some embodiments, the system includes one or more projector, light source, or other means of projecting a light or other indication (each a "projector" 140) onto a monitored item, such as a topping, or adjacent to the same. In some embodiments, the projector 140 is positioned above the monitored item and/or is otherwise displaced from the monitored item. In some embodiments, a temperature sensor 130 serves as a projector and/or is positioned adjacent to and/or in close proximity to a respective projector 140. In this way, in some embodiments, alignment of a projector 140 and a respective temperature sensor 130 can be accomplished in a single step. In some embodiments, the projector 140 is configured to illuminate at least a portion of a monitored area, such as an area having a temperature outside of one or more temperature range. In some embodiments, the projector 140 is configured to display a message, such as a measured temperature value, a differential temperature value, an indication of a status of the monitored item, an instruction (such as to use, not use, replace, refill, stir, cool, heat, cover, uncover, or the like), or one or more other message or other indication. In some embodiments, the projector is configured to illuminate at least a portion of a monitored item with one or more color, such as a first, second, or third color associated with respective first, second, and third conditions. In some embodiments, the first, second, and third colors are green, yellow, and red, respectively, and the first, second and third conditions are associated with a measured and/or adjusted temperature value of a respective monitored item being within a first temperature range, being outside the first temperature range but within a second temperature range, or being outside the first and second temperature ranges, respectively.

In some embodiments, the system is configured to project a message, light, or other indication onto a surface positioned adjacent to a monitored item, such as onto a projection surface 145 adjacent to a bin 150 for holding one or more topping 10. In some embodiments, the projection surface 145 is positioned such that the projected indication is conspicuous to a user while being inconspicuous to and/or concealed from a customer. In some embodiments, the projection surface is positioned along a back surface of a bin 150. In some embodiments, the projection surface is generally perpendicular with a worker's line of sight or otherwise angled so as to be in a worker's line of sight while. In some embodiments, the projection surface is generally parallel to a customer's line of sight and/or is concealed from a customer's line of sight.

In some embodiments, the system is configured to prevent or otherwise inhibit access to a topping based on one or more temperature reading associated with the topping being outside of one or more range. In some embodiments, the system is configured to at least partially close a bin lid 155 based on a temperature of a respective topping being outside of a first temperature range, such as a preferred temperature range. In some embodiments, the system is configured to completely close a bin lid 155 based on a temperature of a respective topping being outside of a second temperature range, such as a required temperature range.

In some embodiments, the system is configured to automatically turn on one or more cooling or heating system and/or a rail system based on a set schedule and/or otherwise based on temperature of one or more monitored item. In some embodiments, the system is configured to automatically turn on a heating or cooling system and/or a rail system upon detection of a bin 150 or other monitored item being moved to a first configuration, such as by positioning such item onto a rail system of the present invention. In some embodiments, the system is configured to automatically turn off one or more cooling or heating system and/or a rail system based on a set schedule and/or otherwise based on temperature of one or more monitored item. In some embodiments, the system is configured to automatically turn off a heating or cooling system and/or a rail system upon detection of bins or other monitored items being moved away from a first configuration, such as by removing such items from a rail system of the present invention. In some embodiments, the system is configured to prevent or otherwise inhibit a heating or cooling system and/or a rail system from being turned to an off configuration if one or more monitored item is in a first configuration, such as when such items are positioned in or adjacent to a rail system of the present invention.

In some embodiments, one or more secondary system is utilized to verify that a topping is positioned in a correct location. In some embodiments, one or more camera, photo sensor, or the like is utilized to detect one or more property of the topping, such as a color, size, density, temperature, or the like. In some embodiments, first device is configured for determining a quantity or volume of a topping and one of the first device or a second device (such as a scale) is configured for determining a mass of associated toppings. In some embodiments, the system is configured to provide a warning or other indication to one or more user, such as a worker, a manager, a customer, or the like, if one or more topping or other monitored item is mislocated or otherwise contaminated (a "potential discrepancy"). In some embodiments, the system is configured to require a user input to verify one or more topping or other monitored item in one or more location, such as one or more location for which a potential discrepancy is determined. In some embodiments, the system is configured to prevent access to and/or otherwise inhibit access to one or more topping or other monitored item for which a potential discrepancy has been determined. In some embodiments, the system is configured to at least partially conceal and/or otherwise inhibit visibility of and/or access to one or more potential discrepancy.

In some embodiments, the system includes one or more proximity sensor or other sensor for detecting foreign objects, such as a worker's hands or arms. In some embodiments, the system is configured to analyze proximity data so as to determine whether a worker has interfaced with one or more item over a set period of time. In some embodiments, the system is configured to determine and/or predict periods of time within which no toppings are removed from and/or added to respective bins (each being an "inactive period"). In some embodiments, the system is configured to open or close one or more bin lid and/or one or more base lid associated with one or more inactive period. In some embodiments, the system is configured to associate temperature readings with respective active and inactive periods. In some embodiments, the system is configured to isolate unreliable readings, such as readings associated with a temperature reading of a foreign object during an active period (e.g. a worker's hand). In some embodiments, the system is configured to discard isolated readings and/or to otherwise minimize impact to measured and/or predicted temperature ranges associated with one or more monitored item.

In some embodiments, the system is configured to determine one or more rise profile for predicting one or more future potential temperature. In some embodiments, the system is configured to determine a first rise profile, such as a rise profile indicating that a temperature for lettuce is rising at x degrees per hour. In some embodiments, the system includes one or more threshold value for initiating an indication or otherwise providing a notification upon attainment of such threshold value. In some embodiments, one or more threshold value is determined based on one or more preferred temperature range for a respective monitored item, one or more required temperature range for the monitored item, one or more rise profile associated with the monitored item, one or more ambient condition, one or more system condition, mode, or the like, and/or one or more other value now known or later discovered for influencing a temperature and/or quality of such monitored item. In some embodiments, the threshold value associated with a rise profile is within preferred and/or required temperature range such that the system is configured to initiate remediation action prior to the temperature of the monitored item reaching a threshold value of such ranges.

In some embodiments, the system is configured to obtain and/or store thermodynamic properties of each monitored item so as to facilitate calculation of respective remediation threshold values. In some embodiments, one or more rise profile or other temperature characteristic is utilized in obtaining one or more remediation threshold value. In some embodiments, the system is configured to take remedial action by generating a warning or instruction to take action and/or by triggering an action, such as by triggering a super-cool mode, a super-chill mode, isolating one or more monitored item from ambient air or otherwise isolating the same, closing or opening a lid, or the like.

In some embodiments, the system is configured to self-diagnose and/or to allow one or more user or other system to diagnose the system, such as by monitoring one or more temperature reading, rise profile, system mode, ambient conditions, or the like. In some embodiments, the system includes one or more sensor on one or more compressor or other system operational components, or the like. In some embodiments, the system is configured to diagnose a performance of a compressor, or other component, or the like. In some embodiments, the system is configured to provide instructions for maintaining a compressor, or other system component, or the like, such as instructing a user or other system to clean a compressor, recharge coolant, or the like. In some embodiments, the system is configured to generate one or more temperature range for a first monitored item based on one or more temperature range and/or one or more remediation threshold value of a second monitored item. In some embodiments, a first remediation threshold value associated with the first monitored item is an upper or lower threshold value of a first and/or second temperature range associated with the first monitored item.

In some embodiments, the present invention includes a method of monitoring and/or controlling or otherwise influencing temperatures associated with one or more topping, structure, and/or system of the present invention. In some embodiments, the method includes utilizing a monitoring system of the present invention. In some embodiments, the monitoring system is configured to monitor a base 100 having a plurality of bins 150 for holding a variety of toppings 10. In some embodiments, a map of the toppings 10 is developed by the monitoring system and/or is provided to the monitoring system. In some embodiments, the map includes temperature range information for at least some of the toppings. In some embodiments, each temperature range includes at least one of a preferred temperature range and an allowed temperature range. In some embodiments, a preferred temperature range is a temperature range within which it is preferable to keep the food item and an allowed temperature range is a temperature range within which it is required to keep the food item.

In some embodiments, a single temperature sensor 130 is configured to obtain temperature readings for a plurality of toppings 10 and/or at a plurality of locations associated with one or more monitored topping 10, structure, or system (each a "monitored item") of the present invention. In some embodiments, a plurality of temperature sensors 130 are configured to obtain a temperature reading for a single monitored item, such as by monitoring one or more location associated with the same. In this way, the present invention is configurable to provide flexibility when one or more sensor is damaged or unavailable, when one or more reading is inaccurate and/or requires verification, and/or as otherwise desired or required, such as to match or otherwise accommodate a layout of monitored items within one or more monitored zone.

In some embodiments, one or more temperature sensor 130 is installed onto a structure positioned above one or more monitored zone. In some such embodiments, the structure is a lid assembly, a rack, a support structure (such as for a glass partition), or the like. In this way, the temperature sensors 130 are capable of providing temperature readings for, and maintaining relatively unobstructed line of sight with, one or more monitored zone. In some embodiments, a single monitored zone contains a single monitored item. In other embodiments, a single monitored zone contains a variety of monitored items associated with a variety of preferred and/or allowed temperature ranges.

In some embodiments, the monitoring system includes a single temperature sensor 130. In other embodiments, the monitoring system includes a plurality of individually controlled temperature sensors 130. In still other embodiments, the monitoring system includes a plurality of temperature sensors 130, at least some of which are grouped together. In this way, the system is scalable and configurable so as to accommodate efficient and accurate temperature monitoring for small areas and large areas, as required. In some such embodiments, a single sensor or group of sensors is configured for use with a specific sized bin (e.g. a ⅙ sized bin); however, such sensor or group of sensors are capable of being combined with additional similarly configured sensors or groups of sensors to accommodate larger sized bins. For example, in embodiments in which each single sensor is configured to monitor a ⅙ sized bin, two ⅙ sized bins may be replaced with a ⅓ sized bin and two sensors are utilized together to monitor the larger bin. In some such embodiments, when multiple sensors or groups of sensor are combined together to accommodate larger sized bins, temperature readings are averaged and/or outlier temperatures are discard. In some embodiments, one or more temperature sensor of the present invention is configured to assist in creating or verifying a thermal imaging map or the like. In some embodiments, the system is configured to identify a plurality of thermal zones from a single image, stitch together a plurality of images associated with a single thermal zone, and/or otherwise identify one or more related thermal and/or imaging zone related to the same. In some embodiments, the system is configured to identify misplaced items, such as based on weight, color, thermal properties, or the like associated with such items. In some embodiments, the system is configured to identify optimum areas for location of one or more item, such as based on historical and current information. In some embodiments, a computer or other processing device of the system is configured to arrange or identify an arrangement of bins based on thermal or other information.

In some embodiments, the system is configured so as to associate first, second, and third sensors with respective first, second, and third bins, such as ⅙ size bins. In some embodiments, the system is configured so as to allow the first, second, and third sensors to be associated with a respective fourth bin, such as a ½ size bin that replaces the three ⅙ size bins. In some embodiments, the system is configured to average data associated with a plurality of associated sensors. In some embodiments, the system is configured to isolate outlier information by comparing two or more contemporaneous or non-contemporaneous reading.

In some embodiments, a plurality of temperature readings from one or more temperature sensor 130 are averaged together and/or are otherwise utilized together to determine a temperature value associated with a monitored item. In some such embodiments, a localized temperature value is compared to one or more temperature range and an average temperature value is compared with the same one or more temperature range and/or with one or more different temperature range. In some embodiments, the system provides a warning and/or alert associated with the average temperature and/or local temperature being outside of one or more respective temperature range.

In some embodiments, temperatures and/or other properties of ambient air and/or one or more item associated with a food item (each an "associated item") are utilized to estimate current temperatures of a monitored item and/or to predict future temperatures of a monitored item. In some such embodiments, the associated item is a utensil, a bin 150, a tray, a pan, or any number of other items that may be in contact with or close proximity to a monitored item such that it is capable of influencing the temperature of the monitored item. In some embodiments, factors associated with heat transfer, such as moisture levels in the air and/or otherwise associated with the monitored item (especially moisture levels in monitored food items), are determined to further refine temperature estimates and predictions. In some embodiments, the system provides a warning and/or alert associated with estimated and/or predicted temperatures being outside of one or more preferred and/or allowable temperature range.

In some embodiments, the system records and/or analyzes temperatures and/or other properties associated with a monitored item, ambient air surrounding the monitored item, and/or one or more associated item. In some such embodiments, the system utilizes recorded information to estimate current temperatures of a monitored item and/or to predict future temperatures of a monitored item. In some embodiments, the system provides a warning and/or alert associated with estimated and/or predicted temperatures being outside of one or more preferred and/or allowable temperature range.

In some embodiments, the system provides instructions or other information to a user of the system, thereby serving as a training device for the user and/or a digital assistant to the user. In some such embodiments, the system provides an instruction to chill, heat, cover, stir, uncover, remove, discard, and/or otherwise perform one or more function associated with one or more food item. In this way, the system of the present invention increases safety of food regardless of the training level of the user. In some embodiments, the system further includes a control system and one or more mechanism for causing one or more action, such as causing the system to chill, heat, cover, stir, uncover, cover, discard, and/or otherwise automatically perform one or more function associated with one or more food item. In this way, the system does not rely on a user to perform the function. In some embodiments, the system further includes one or more means of detecting and recording whether one or more function was completed and when such function was completed. In this way, the system is capable of assessing a local user's responsiveness to instructions and/or providing a means for a remote user to provide oversight to the local user. In some such embodiments, the system is further configured to determine and record whether any portion of a food item was added to and/or removed from the system (such as when replenishing product, discarding product, replacing product, and/or serving product) prior to the function being completed. In some such embodiments, one or more weighing system and/or other system is utilized to determine whether food was added to and/or removed from the system and/or when and how much food was added to and/or removed from the system.

In some embodiments, a heating or cooling function is a rapid heating or cooling function. In some embodiments, the system is configured to isolate the food products from ambient air and/or from a user, such as by closing a door of the system, thereby allowing the system to utilize one or more extreme thermodynamic process to either heat or chill items within the system. In some such embodiments, the extreme thermodynamic process includes causing a volume of gas, such as nitrogen or carbon dioxide, to expand within the system, thereby creating a low temperature environment within the system. In some such embodiments, the system is sealed and air is removed from the system prior to allowing the gas to expand within the system. In some embodiments, one or more bin and/or lid separates the food item from the gas.

In some embodiments, the system is configured to take a temperature reading during and/or upon completion of one or more function. In some such embodiments, the system is configured to take one or more temperature reading during and/or upon completion of a heating, chilling, or other thermodynamic function being completed, thereby determining the effectiveness of the related thermodynamic function and/or determining whether to continue the heating, chilling, or other respective function. In some embodiments, the system is configured to take a temperature reading during a stirring or other physical function, thereby obtaining a more accurate temperature reading of the item being stirred or otherwise physically influenced. In some embodiments, the system is configured to take a temperature reading before, during, and/or after a covering function and/or an uncovering function. In some embodiments, the system is configured to take a temperature reading before, during, and/or after food product is added to and/or removed from a bin, thereby obtaining additional temperature information of items remaining in the bin (thereby enabling the system to determine whether additional items should be removed and/or whether they can remain in the bin) and/or items added to the bin (thereby enabling the system to determine a temperature of new items and/or to determine how new items have and/or may affect temperature of other items).

In some embodiments, the system includes a number of audible and/or visual signals. In some embodiments, the system includes an alarm or other signal to provide an indication that the system is holding a desired temperature, such as a temperature within a preferred temperature range, and/or is falling (or rising as the case may be) outside of one or more temperature range, such as a preferred and/or allowed temperature range.

In some embodiments, the system provides visual depictions of measured, estimated, and/or predicted temperatures for one or more food item and/or food zone. In some such embodiments, the visual depiction provides one or more indication of one or more concern areas, thereby further assisting the user.

In some embodiments, the system provides a digital or printed map of food items positioned in one or more food zones. In some embodiments, the map is color coded or otherwise coded to indicate items that should be maintained at an elevated temperatures and items that should be maintained at lower temperatures. In this way, the system is capable of assisting a user in determining whether the products are placed in a logical manner. In some such embodiments, the system provides instructions for moving one or more item within a zone and/or to a different zone so that the items will be placed in a more logical manner. In other embodiments, the system includes one or more function for causing one or more item to be automatically moved to a more appropriate area. For instance, if a cold item is placed near a warm item, the system is configured to move the cold item away from a warming device when a warming device is being utilized to increase the temperature of the warm item (or to otherwise shield the cold item from heat associated with the warming device), thereby preventing the warming device from inadvertently increasing the temperature of the cool item.

In some embodiments, the system provides a color-coded map of one or more zone indicating the status of one or more food item in relation to a respective temperature range. In some such embodiments, the system displays a green color for food items that are within a respective preferred temperature range, a yellow color for food items that are outside of a respective preferred temperature range but that are still within an allowed temperature range, and a red color for food items that are outside of an allowed temperature range. In this way, a user can quickly and easily determine whether food items need to be discarded and/or whether food items are at a safe temperature.

In some embodiments, the system includes one or more sensor for determining whether one or more item is missing from a zone (such as a pan or bin that has been removed from a zone so that it can be refilled) and/or whether such item is located in the correct position. In some embodiments, the sensor is an optical sensor, a scanner, a camera, or the like. In some embodiments, the sensor is configured to detect one or more characteristic of the item, thereby confirming the presence of the item and/or the location of the item.

In some embodiments, the system includes one or more sensor for determining the quantity of an item in one or more zone or other location. In this way, the system is capable of determining whether a particular zone or other area is overloaded. In some embodiments, the system is further configured to determine and record times that food items are removed from a zone and the condition of the food item when it is removed from the zone. In this way, the system is capable of estimating what portion of the food item is discarded and what portion of the food item is sold or otherwise consumed. In some embodiments, information pertaining to waste and consumption rates is utilized by the system to determine optimum amounts of a particular food product and cycle schedules for moving food products into and/or out of food zones. In some embodiments, one or more food zone is a temperature controlled food zone, such as a freezer, a chiller, or a warmer.

In some embodiments, the system includes one or more motion sensor 170 for detecting movement of items in and out of one or more food zone. In this way, the system is capable of more accurately ensuring that temperature readings are not adversely affected by normal operation of the system and/or preparation, stocking, and/or serving of food items (e.g. when a worker's arm/hand enters the system). In some embodiments, one or more motion sensor 170 is utilized to assist in identifying discrepant temperature readings, such as temperature readings of a user's hand while reaching for a measured item and/or a user's arm while reaching over the measured item.

In some embodiments, the system further includes one or more sensor associated with preparation of food and/or otherwise manipulating the temperature of food. In some embodiments, the system is configured to detect moisture content of food and changes in moisture content of the food during one or more thermodynamic process, such as a cooking process, a chilling process, and/or a freezing process. In some embodiments, the system is further configured to determine and record an amount of time a food item is exposed to thermodynamic process and the conditions associated with such thermodynamic process, including one or more condition of the food product and one or more condition of one or more other item. In some such embodiments, the system includes a sensor for detecting change in one or more property of the item during the thermodynamic process, such as browning of a food item during a cooking process. In some embodiments, the system is configured to measure or predict evaporation, drying out, or other adverse effects associated with one or more monitored item. In some embodiments, the system is configured to mitigate adverse effects by initiating one or more event, such as by introducing periodic mists to such monitored item, periodically isolating the monitored item from ambient air, generating an alert or other warning, or the like.

In some embodiments, a temperature of a food item, a temperature of ambient air, a temperature of a bin holding the food item, and a temperature of an adjacent food item or other adjacent item are each utilized in determining a current temperature and/or a predicted future temperature of a food item. In some embodiments, the system causes a powered lid or other structure of the system to close, thereby creating a controlled environment surrounding one or more food zone, thereby making it easier to control temperature changes, and further creating a barrier between a user and the food items, thereby preventing users from serving food that is at an unsafe temperature.

In some embodiments, one or more warning or signal is provided to a remote user located away from the food zones. In this way, the remote user is capable of monitoring temperatures of the food items. In some such embodiments, the remote user is capable of closing or opening a lid of the system, thereby providing the remote user with some level of control over the local user. In some embodiments, the system is configured to automatically close a lid or otherwise prevent a local user from accessing a food zone based on one or more criteria, such as a warning that goes unaddressed by the local user and/or the local user's failure to discard a food item. In some such embodiments, the system continues to prevent the local user from accessing the food zone until the remote user grants such access.

In some embodiments, information obtained from the system is recorded and logged for future reference. In some such embodiments, at least some of the information is configured to satisfy government and/or other regulations associated with food service and food prep. In some embodiments, the system includes one or more algorithm to distinguish temperature readings of one or more object. In some embodiments, the system obtains a first series of readings from a first sensor during a first period and compares each such reading to predetermined threshold values. In some embodiments, the system utilizes the first series of readings to predict future temperature values for the monitored item. In some embodiments, the system obtains information associated with ambient air, surrounding temperatures, system performance (such as charge, temperature, cleanliness, etc. associated with one or more cooling system, heating system, stirring system, or the like) for use in predicting future temperature values. In some embodiments, the system is configured to identify unreliable information (such as information associated with a user's hand or arm being positioned between a sensor and a monitored item when a reading is taken), such as by predicting an anticipated actual temperature value associated with the same.

In some embodiments, one or more sensor is positioned relative to one or more food item so as to minimize obstructions, such as with a user reaching into the food prep area. In some embodiments, the system includes one or more feature for detecting obstructions and/or for determining a temperature of a food item despite the obstructions. For instance, in some embodiments the system is configured to obtain a first temperature measurement with a first unobstructed temperature sensor and is further configured to obtain a second temperature measurement with a second unobstructed temperature sensor if the first temperature sensor becomes obstructed. In other embodiments, the system is configured to detect an obstruction, to determine whether a reading has been influenced by an obstruction, and/or to discount or otherwise ignore temperature or other readings that have been influenced by an obstruction.

For instance, in some embodiments an operator's arm or other obstruction may prevent a specific temperature sensor from obtaining a temperature reading of a particular item. In some such embodiments, the system is configured to repurpose or otherwise cause another temperature sensor positioned at an unobstructed location to take a temperature reading. In other such embodiments, the system generates a warning or otherwise directs a user to move the obstacle so that an accurate reading can be obtained. In still other embodiments, the system is configured to discard or otherwise discount unreliable readings.

In some embodiments, the system includes a warning of rapid or otherwise unexpected changes to one or more item and/or of the ambient air. In this way, a local and/or remote user is provided with an indication of a potential issue. In some such embodiments, the system further calculates potential future temperature values of one or more item if the rapid or otherwise unexpected change persists or otherwise fails to improve. In this way, the system is capable of providing warnings associated with increased risks associated with such unexpected changes and/or can provide directions to a user to mitigate such unexpected changes. In some embodiments, the system is configured with one or more means of communicating information now known or later developed. In some embodiments, the system includes a central computer in data communication with one or more sensor or other component of the present invention, such as through direct communication and/or communication through one or more communication service and/or through one or more communication device.

In some embodiments, the system further includes one or more feature for increasing efficiency associated with accessing one or more topping, thereby decreasing heat transfer between food items and ambient air. In some such embodiments, the system includes an identification system, such as a lighting system, for identifying one or more food item associated with a current order. In some embodiments, the identification system is associated with a lid of each item, such as by including a light or other designation associated with each lid. In this way, a user is able to more quickly identify items for which lids must be replaced, making the user less likely to inadvertently remove the wrong lid. In some embodiments, the lid automatically opens when it is identified. In other embodiments, unidentified lids are prevented from opening.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A temperature monitoring system comprising:
   a first sensor for sensing a first temperature value associated with a first monitored item;
   a database for storing information associated with a first temperature range;
   a processor in data communication with said database and said first sensor, said processor being configured to compare said first temperature value with said first temperature range,
      wherein the system is configured to perform a first function if the first temperature value is outside of the first temperature range, and
      wherein the first function comprises initiating at least one of a stirring process, a heating process, a cooling process, a notification process, or an inhibiting process; and
   a first bin, wherein the inhibiting process comprises moving said first bin from a first configuration to a second configuration, thereby moving the first item from an accessible configuration to an inaccessible configuration.

2. The system of claim 1, further comprising a cooling system that is configured to initiate a super-cooling mode.

3. The system of claim 1, further comprising one or more proximity sensors for detecting when one or more user is within a vicinity of the base.

4. The system of claim 1, further comprising a first indication means, wherein said first indication means comprises a display panel that is configured to display a default screen, said default screen comprising at least one of a banner, an icon, or a temperature display associated with one or more of the toppings.

5. The system of claim 4, wherein the banner displays real-time information associated with two or more toppings, wherein the icon displays identification information associated with at least one respective topping, wherein the temperature display is associated with a respective icon, and wherein the temperature display displays real-time information associated with the at least one respective topping.

6. The system of claim 5, wherein the temperature display is configured to display a first color when said first temperature value is within said first temperature range, a second color when said first temperature value is outside of said first temperature range but within a second temperature range, and a third color when said first temperature value is outside of the said first temperature range and the second temperature range.

7. The system of claim 1, further comprising a first indication means, wherein the first indication means comprises a plurality of indication lights positioned adjacent to respective toppings.

8. The system of claim 7, wherein the plurality of indication lights are configured to display a first color when said first temperature value is outside of said first temperature range but within a second temperature range and a second color when said first temperature value is outside of the said first temperature range and the second temperature range.

9. The system of claim 1, further comprising a first indication means, wherein the first indication means comprises a plurality of projectors that are configured to project light onto a projection surface located on or positioned adjacent to a respective topping.

10. The system of claim 9, wherein the plurality of projectors are configured to project a first color of light when said first temperature value is outside of said first temperature range but within a second temperature range and a second color of light when said first temperature value is outside of the said first temperature range and the second temperature range.

11. The system of claim 1, wherein said first bin comprises an interior area for holding the first monitored item and defines an opening for providing access to said interior area, wherein moving said first bin from the first configuration to the second configuration comprises inhibiting access to said interior area.

12. The system of claim 1, wherein the first function comprises initiating a notification process, the notification process comprising providing notification to a user in the vicinity of the first monitored item and providing notification to a user located remotely from the first monitored item.

13. The system of claim 1, wherein the first function comprises initiating a notification process, the notification process comprising providing notification to a user in the vicinity of the first monitored item, the notification being in the form of a color indication illuminated onto or adjacent to the first monitored item.

14. The system of claim 1, wherein the first temperature range is derived by the system by predicting potential future temperature values associated with the first monitored item based on thermodynamic information associated with the first monitored item.

15. The system of claim 14, wherein the system determines a first remediation threshold value for the first monitored item based on one or more rise profile associated with the first monitored item.

16. The system of claim 15, wherein an upper threshold of the first temperature range is equal to the first remediation threshold value.

17. A temperature monitoring system comprising:
a first sensor for sensing a first temperature value associated with a first monitored item;
a database for storing information associated with a first temperature range;
a processor in data communication with said database and said first sensor, said processor being configured to compare said first temperature value with said first temperature range,
wherein the system is configured to initiate an inhibiting process if the first temperature value is outside of the first temperature range, and
a first bin, wherein the inhibiting process comprises moving said first bin from a first configuration to a second configuration, thereby moving the first item from an accessible configuration to an inaccessible configuration.

18. The system of claim 17, wherein said initiation of said inhibiting process includes providing a notification visible to a user.

19. The system of claim 18, wherein said notification is a prompt to the user to manually control the configuration of said first bin.

20. The system of claim 17, wherein said inhibiting process is performed by controlling a configuration of the first bin by controlling a configuration of one or more lid associated with said first bin.

21. The system of claim 17, wherein the processor is configured to perform a first function, wherein the first function is performed if the first temperature value is outside of the first temperature range.

22. The system of claim 21, wherein the first function comprises initiating a stirring process.

23. The system of claim 21, wherein the first function comprises initiating a heating process.

24. The system of claim 21, wherein the first function comprises initiating a cooling process.

25. The system of claim 21, wherein the first function comprises initiating a notification process.

* * * * *